J. B. KING.
Straw Cutter.

No. 2,095.  Patented May 15, 1841.

UNITED STATES PATENT OFFICE.

JOHN B. KING, OF ATHENS, TENNESSEE.

STRAW-CUTTER.

Specification of Letters Patent No. 2,095, dated May 15, 1841.

*To all whom it may concern:*

Be it known that I, JOHN B. KING, of Athens, in the county of McMinn and State of Tennessee, have invented a new and useful Machine for Cutting Straw; and I do hereby declare that the following is a full, clear, and exact description of the construction and operation of the same, reference being had to the annexed drawings, making a part of this specification, in which—

Figure 2:
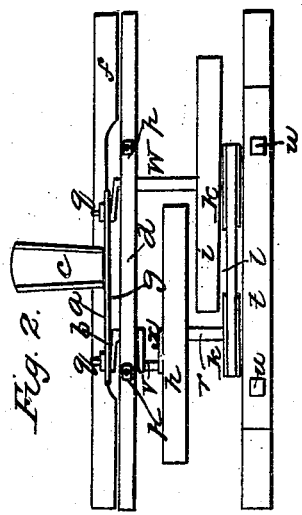
Figure 4:
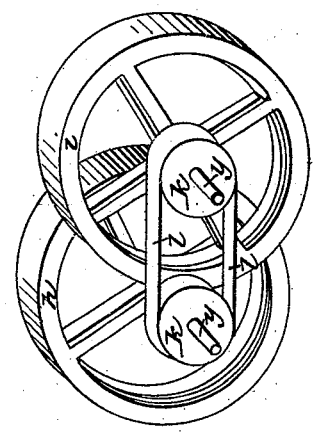
Figure 1:
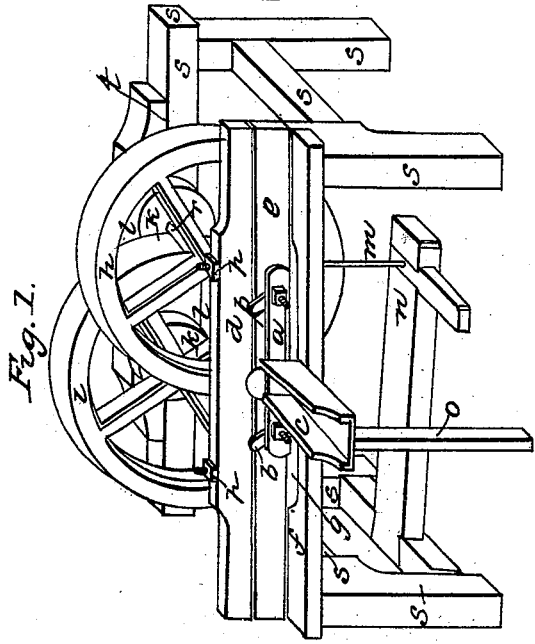
Figure 3:
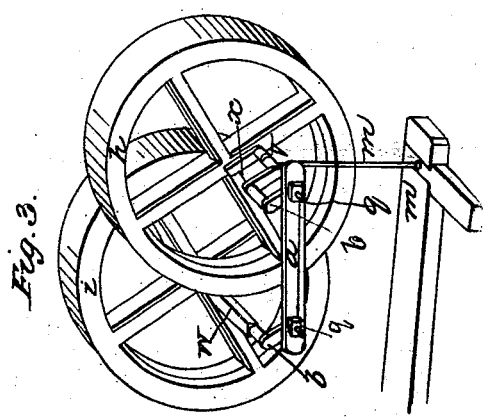

Figure 1 is a perspective view of the machine; Fig. 2, the ground plan or horizontal view. Fig. 3 is a perspective view of the balance wheels, the knife, the cranks and treadle; Fig. 4, a perspective view of the opposite side of the balance wheels, the drums, and cranks, also the band.

The following is a description of the different parts of the machine.

Fig. 1, $a$, knife for cutting the straw; $b$, front part of the crank; $c$, the box in which the straw is placed for cutting; $d$, the upper part of the head block; $e$, the lower part of the head block; $f$, a tie beam on which the box rests; $g$, the aperture through which the straw falls; $h$ and $i$, the balance wheels; $k$, the drums on which the band act; $l$, the band; $m$, a rod extending from the treadle to the crank; $n$, the treadle; $o$, an upright under the box; $v$, the main crank and hook (in Fig. 3); $p$, the bolts that confine the headblocks together (in Fig. 3); $q$, the screws and taps that confines the knife to the cranks; $r$, the axle of the balance wheel $h$; $s$, the frame on which the machine is hung; $t$, the opposite head block.

Fig. 2, $a$, the knife for cutting the straw; $b$, front part of the cranks; $c$, the box in which the straw is placed for cutting; $d$, the upper part of the headblocks (in Fig. 1); $e$, the lower part of the headblocks (in Fig. 1); $f$, a tie beam on which the box rests; $g$, the aperture through which the straw falls; $h$ and $i$, the balance wheels; $k$, the drums on which the band acts; $l$, the band; $p$, the bolts that confines the headblocks together; $q$, the screw and tap that fastens the knife to the cranks; $r$, the axle between the drum and main crank; $t$, the opposite headblock; $u$, the bolts confining the opposite headblock together; $v$, the main crank and hook; $w$, the axle of the balance wheel $i$; $x$, first turn of the main crank.

Fig. 3, $a$, the knife for cutting the straw; $b$, the front part of the crank; $h$ and $i$, balance wheel; $i$, balance wheel; $m$, a rod extending from the treadle to the crank; $n$, the treadle; $w$, the axle between the balance wheel and headblock.

Fig. 4, $h$ and $i$, balance wheels; $k$, the drums on which the band acts; $l$, a leather band that acts on the drums; $y$, the axles on which the drums are placed.

To enable others skilled in the art to make and use my invention, I will proceed to describe its construction and operation.

I make a frame of good durable timber of suitable height width and length on which I hang the machinery the construction of the frame is as follows there are four posts framed into two sets of double headblocks with long tenons on the upper ends of the posts that extend through mortises that are made in the head blocks (as seen in Fig. 1, letters $d$ and $e$) I also place another headblock on the opposite side of the machine (as seen in Fig. 1, letter $t$) and then frame two pieces of timber one at each end across from the front posts to the opposite posts to confine them together which forms the frame on which the machine is hung. I also frame a tiebeam in front of the front headblock on which I place one end of the feedbox while the other end is supported by an upright post. This tiebeam is framed on two tenons that are cut on the front posts that support the front headblocks and immediately opposite and in front of the lower edge of that headblock there are iron boxes placed in the joints of these headblocks through which the gudgeons of the axles runs these axles each one form a crank in front of the front headblock and are made of bars of iron of a sufficient size and on these cranks the knife for cutting the straw is placed in the following manner, there are two iron pivots placed in the cranks near their ends and made fast in the cranks by means of riveting the knife has a round hole in each end and is placed on these pivots and is there confined by means of screw taps that are placed on screws that are cut on the ends of the pivots, the bars that form the cranks and gudgeons pass through and across from the front headblocks to the opposite headblocks where they are also formed into round gudgeons and run in boxes of iron there are two balance wheels placed one on each of these axles of sufficient weight and size (as seen in Fig. 4) which wheels are placed one a little in front of the other so that they run side by side nearly to their center, there are also two small drums placed on the axles immediately behind the balance wheels (as also seen in Fig. 4) around these drums there is a leather band placed that regulates the motion of the wheels when in action. There is also a main crank made in one of the axles by bending the bar obliquely in rear of the front headblock which (crank somewhat represents the letter U) (as seen in Fig. 2, letter *b*). From the main crank I extend an iron rod to a treadle the rod having a hook on its upper end that works round the main crank (as seen in Fig. 3 letter *m*) there are also four iron bolts with screws and taps put two through the front and two through the opposite headblocks these bolts confine the upper part of the headblock to the lower the former being made fast to the frame (as seen in Fig. 2, letter *p*).

I fasten a treadle to the lower ends of the posts of the machine at one end and let it pass under the machinery past the feed box until it extends as far as the main crank. This treadle is made by framing two pieces of timber together the one across the end of the other. The cross piece is placed immediately betwixt the lower ends of the posts that support the machine and there act on pivots that are made fast in the post and extend into the ends of the cross piece of the treadle and at the other end of the treadle I frame in a short piece of timber of sufficient size for the foot to act on while the machine is in motion (as seen in Fig. 3 letter *n*) the fed box is made of sufficient size by nailing three pieces of plank together of equal length one for a bottom and the other two for the two sides and is attached to the machine in the manner before described. I place the straw in the feed box, then start the wheels by hand. Then by acting on the treadle with the foot the machine is set in motion the circle performed by the cranks elevates the knife and when thrown up I move the straw forward by hand in the feed box the knife returning is driven through the straw by the power that is produced by the balance wheels while the band acting on the drums gives equal force and velocity to the wheels.

What I claim as my invention and desire to secure by Letters Patent is—

The method of hanging the knife on two pivots that are placed in the two cranks each having a separate balance wheel attached to it which balance wheels receive a simultaneous motion produced by means of two drums that are coupled together by a band.

JOHN B. KING.

Witnesses:
 WILLIS W. DAVIS,
 ANTHONY DAVIS.